(12) United States Patent
Harikumar et al.

(10) Patent No.: US 12,008,698 B2
(45) Date of Patent: *Jun. 11, 2024

(54) IMAGE SEGMENTATION USING TEXT EMBEDDING

(71) Applicant: Adobe Inc., San Jose, CA (US)

(72) Inventors: Midhun Harikumar, Santa Clara, CA (US); Pranav Aggarwal, San Jose, CA (US); Baldo Faieta, San Francisco, CA (US); Ajinkya Kale, San Jose, CA (US); Zhe Lin, Bellevue, WA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/117,155

(22) Filed: Mar. 3, 2023

(65) Prior Publication Data

US 2023/0206525 A1 Jun. 29, 2023

Related U.S. Application Data

(63) Continuation of application No. 16/952,008, filed on Nov. 18, 2020, now Pat. No. 11,615,567.

(51) Int. Cl.
*G06T 11/60* (2006.01)
*G06T 7/11* (2017.01)
*G06T 7/162* (2017.01)

(52) U.S. Cl.
CPC ............... *G06T 11/60* (2013.01); *G06T 7/11* (2017.01); *G06T 7/162* (2017.01); *G06T 2207/20081* (2013.01); *G06T 2207/20084* (2013.01)

(58) Field of Classification Search
CPC . G06T 11/60; G06T 7/11; G06T 7/162; G06T 2207/20081; G06T 2207/20084
See application file for complete search history.

(56) References Cited

U.S. PATENT DOCUMENTS 9,075,824 B2 * 7/2015 Gordo ............... G06F 16/583
10,445,431 B1 10/2019 Lev-Tov et al.
(Continued)

OTHER PUBLICATIONS

"Thrive in a Digital-First Marketplace", Lionbridge Translation & Localization for Global Enterprises, Accessed from Internet on Aug. 25, 2022, 18 pages.
(Continued)

*Primary Examiner* — Bobbak Safaipour
(74) *Attorney, Agent, or Firm* — Kilpatrick Townsend & Stockton LLP

(57) ABSTRACT

A non-transitory computer-readable medium includes program code that is stored thereon. The program code is executable by one or more processing devices for performing operations including generating, using a model, a learned image representation of a target image. The operations further include generating, using a text embedding model, a text embedding of a text query. The text embedding and the learned image representation of the target image are in a same embedding space. Additionally, the operations include convolving the learned image representation of the target image with the text embedding of the text query. Moreover, the operations include generating an object-segmented image based on the convolving of the learned image representation of the target image with the text embedding.

20 Claims, 7 Drawing Sheets

(56) References Cited

U.S. PATENT DOCUMENTS

| | | | | |
|---|---|---|---|---|
| 11,080,330 | B2* | 8/2021 | Suyash | G06F 16/639 |
| 11,144,784 | B2* | 10/2021 | Aggarwal | G06V 30/19147 |
| 11,210,306 | B2* | 12/2021 | Steedman Henderson | |
| | | | | G06N 3/084 |
| 11,423,314 | B2* | 8/2022 | Podgorny | G10L 15/04 |
| 11,615,567 | B2* | 3/2023 | Harikumar | G06T 11/60 |
| | | | | 382/173 |
| 2020/0117951 | A1* | 4/2020 | Li | G06V 10/454 |
| 2020/0151448 | A1* | 5/2020 | Lin | G06V 10/82 |
| 2020/0250537 | A1 | 8/2020 | Li et al. | |
| 2020/0349707 | A1* | 11/2020 | Hosseini | G06V 10/764 |
| 2020/0380298 | A1 | 12/2020 | Aggarwal et al. | |
| 2021/0019343 | A1* | 1/2021 | Singh | G06N 3/04 |
| 2021/0081728 | A1* | 3/2021 | Lai | G06V 10/82 |
| 2021/0241034 | A1* | 8/2021 | Laradji | G06N 3/08 |
| 2021/0264203 | A1* | 8/2021 | Fuxman | G06V 10/774 |
| 2021/0319053 | A1* | 10/2021 | Pirovano | G06F 16/345 |
| 2021/0374168 | A1* | 12/2021 | Srinivasan | G06V 10/82 |
| 2021/0406616 | A1* | 12/2021 | Yang | G06V 10/50 |
| 2022/0083744 | A1* | 3/2022 | Li | G06N 3/045 |
| 2022/0101521 | A1* | 3/2022 | Katzmann | G06V 20/653 |
| 2022/0121702 | A1* | 4/2022 | Kale | G06N 3/04 |
| 2022/0327657 | A1* | 10/2022 | Zheng | G06T 9/002 |
| 2022/0343622 | A1* | 10/2022 | Wang | G06T 7/11 |
| 2023/0206661 | A1* | 6/2023 | Choi | G06F 40/166 |
| | | | | 382/156 |

OTHER PUBLICATIONS

"Universal-Sentence-Encoder-Multilingual-Large", Tensor Flow Hub, Available Online at: https://tfhub.dev/google/universal-sentence-encoder-multilinguallarge/3, Accessed from Internet on Nov. 21, 2022, 23 pages.

U.S. Appl. No. 16/952,008, "Corrected Notice of Allowability", dated Sep. 6, 2022, 2 pages.

U.S. Appl. No. 16/952,008, "First Action Interview Office Action Summary", dated Jun. 23, 2022, 5 pages.

U.S. Appl. No. 16/952,008, "First Action Interview Pilot Program Pre-Interview Communication", dated Apr. 12, 2022, 4 pages.

U.S. Appl. No. 16/952,008, "Notice of Allowance", dated Dec. 15, 2022, 10 pages.

U.S. Appl. No. 16/952,008, "Notice of Allowance", dated Aug. 31, 2022, 8 pages.

U.S. Appl. No. 17/075,450, "U.S. Patent Application No.", filed Oct. 20, 2020,.

Aggarwal et al., "Multitask Text-to-Visual Embedding with Titles and Clickthrough Data", Available Online at: https://arxiv.org/pdf/1905.13339.pdf, May 30, 2019, 5 pages.

Artetxe et al., "Massively Multilingual Sentence Embeddings for Zero-Shot Cross-Lingual Transfer and Beyond", Available Online at: https://arxiv.org/pdf/1812.10464.pdf, Sep. 25, 2019, 14 pages.

Calixto et al., "Sentence-Level Multilingual Multi-Modal Embedding for Natural Language Processing", Proceedings of Recent Advances in Natural Language Processing, Sep. 4-6, 2017, pp. 139-148.

Chidambaram et al., "Learning Cross-Lingual Sentence Representations via a Multi-Task Dual-Encoder Model", Available Online at: https://arxiv.org/pdf/1810.12836.pdf, Aug. 1, 2019, 10 pages.

Datta et al., "Image Retrieval: Ideas, Influences, and Trends of the New Age", ACM Computing Surveys, vol. 40, No. 2, Apr. 2008, pp. 1-60.

Deng et al., "Imagenet: A Large-Scale Hierarchical Image Database", Institute of Electrical and Electronics Engineers Conference on Computer Vision and Pattern Recognition, Jun. 20-25, 2009, pp. 248-255.

Elliott et al., "Multi30K: Multilingual English-German Image Descriptions", Proceedings of the 5th Workshop on Vision and Language, Association for Computational Linguistics, May 2, 2016, 5 pages.

Gella et al., "Image Pivoting for Learning Multilingual Multimodal Representations", Proceedings of the 2017 Conference on Empirical Methods in Natural Language Processing, Jul. 24, 2017, 7 pages.

Glorot et al., "Deep Sparse Rectifier Neural Networks", Proceedings of the Fourteenth International Conference on Artificial Intelligence and Statistics, Proceedings of Machine Learning Research, vol. 15, 2011, pp. 315-323.

Grubinger et al., "The IAPR TC-12 Benchmark: A New Evaluation Resource for Visual Information Systems", Available Online at: https://www-i6.informatik.rwth-aachen.de/publications/download/34/Grubinger-LREC-2006.pdf, Oct. 2006, 11 pages.

Hardoon et al., "Canonical Correlation Analysis: An Overview with Application to Learning Methods", Neural Computation, vol. 16, No. 12, Dec. 1, 2004, pp. 2639-2664.

He et al., "Deep Residual Learning for Image Recognition", IEEE Conference on Computer Vision and Pattern Recognition (CVPR), Jun. 27-30, 2016, pp. 770-778.

Hewitt et al., "Learning Translations via Images with a Massively Multilingual Image Dataset", Proceedings of the 56th Annual Meeting of the Association for Computational Linguistics (vol. 1: Long Papers), Association for Computational Linguistics, Jul. 15-20, 2018, pp. 2566-2576.

Hochreiter et al., "Long Short-Term Memory", Neural Computation, vol. 9, No. 8, Nov. 1997, 32 pages.

Horster et al., "Image Retrieval on Large-Scale Image Databases", CIVR '07: Proceedings of the 6th ACM International Conference on Image and Video Retrieval, Association for Computing Machinery, Jul. 9-11, 2007, pp. 17-24.

Huang et al., "Densely Connected Convolutional Networks", in Computer Vision and Pattern Recognition, IEEE Conference on Computer Vision and Pattern Recognition (CVPR), Jul. 21-26, 2017, pp. 4700-4708.

Huang et al., "Multi-Head Attention with Diversity for Learning Grounded Multilingual Multimodal Representations", Available Online at: https://arxiv.org/pdf/1910.00058.pdf, Sep. 30, 2019, 7 pages.

Jing et al., "Visual Search at Pinterest", Proceedings of the 21th ACM SIGKDD International Conference on Knowledge Discovery and Data Mining, Available Online at: https://arxiv.org/pdf/1505.07647.pdf, Mar. 8, 2017, 10 pages.

Kadar et al., "Lessons Learned in Multilingual Grounded Language Learning", Proceedings of the 22nd Conference on Computational Natural Language Learning, Available Online at: https://arxiv.org/pdf/1809.07615.pdf, Sep. 20, 2018, 11 pages.

Kim et al., "MULE: Multimodal Universal Language Embedding", Association for the Advancement of Artificial Intelligence, Available Online at: https://arxiv.org/pdf/1909.03493.pdf, Dec. 28, 2019, 16 pages.

Kingma et al., "ADAM: A Method For Stochastic Optimization", International Conference on Learning Representations, Dec. 22, 2014, 9 pages.

Li et al., "COCO-CN for Cross-Lingual Image Tagging, Captioning and Retrieval", IEEETransactions on Multimedia, Available Online at: https://arxiv.org/pdf/1805.08661.pdf, Jan. 15, 2019, 14 pages.

Lin et al., "Microsoft COCO: Common Objects in Context", European Conference on Computer Vision, Feb. 21, 2015, pp. 1-15.

Mohammadshahi et al., "Aligning Multilingual Word Embeddings for Cross-Modal Retrieval Task", Available Online at: https://arxiv.org/pdf/1910.03291.pdf, Oct. 8, 2019, 7 pages.

Nakayama et al., "Zero-Resource Machine Translation by Multimodal Encoder-Decoder Network with Multimedia Pivot", Available Online at: https://arxiv.org/pdf/1611.04503.pdf, Jul. 23, 2017, 17 pages.

Portaz et al., "Image Search Using Multilingual Texts: a Cross-Modal Learning Approach Between Image and Text", Available Online at: https://arxiv.org/pdf/1903.11299.pdf, May 14, 2019, 9 pages.

Rajendran et al., "Bridge Correlational Neural Networks for Multilingual Multimodal Representation Learning", Proceedings of the 2016 Conference of the North American Chapter of the Association for Computational Linguistics: Human Language Technologies, Available Online at: https://arxiv.org/pdf/1510.03519.pdf, Jul. 1, 2016, 12 pages.

Rotman et al., "Bridging Languages through Images with Deep Partial Canonical Correlation Analysis", Proceedings of the 56th Annual Meeting of the Association for Computational Linguistics, vol. 1: Long Papers, Jul. 2018, pp. 910-921.

(56) References Cited

OTHER PUBLICATIONS

Shankar et al., "Deep Learning Based Large Scale Visual Recommendation and Search for E-Commerce", Available Online at: https://arxiv.org/pdf/1703.02344.pdf, Mar. 7, 2017, 9 pages.

Srivastava et al., "Dropout: A Simple Way to Prevent Neural Networks from Overfitting", Journal of Machine Learning Research, vol. 15, No. 1, Jan. 2014, pp. 1929-1958.

Vaswani et al., "Attention is All You Need", 31st Conference on Neural Information Processing Systems, Available Online at: https://arxiv.org/pdf/1706.03762.pdf, Dec. 6, 2017, pp. 1-15.

Wu et al., "AI Challenger : A Large-scale Dataset for Going Deeper in Image Understanding", Available Online at: https://arxiv.org/pdf/1711.06475.pdf, Nov. 17, 2017, 11 pages.

Yang et al., "Multilingual Universal Sentence Encoder for Semantic Retrieval", Available Online at: https://arxiv.org/pdf/1907.04307.pdf, Jul. 9, 2019, 6 pages.

Yang et al., "Visual Search at eBay", Proceedings of the 23rd ACM SIGKDD International Conference on Knowledge Discovery and Data Mining, Available Online at: https://arxiv.org/pdf/1706.03154.pdf, Jul. 7, 2017, 10 pages.

Yoshikawa et al., "STAIR Captions: Constructing a Large-Scale Japanese Image Caption Dataset", in Proceedings of the 55th Annual Meeting of the Association for Computational Linguistics, vol. 2: Short Papers, Available Online at: https://arxiv.org/pdf/1705.00823.pdf, May 2, 2017, 5 pages.

Zhang et al., "Visual Search at Alibaba", Proceedings of the 24th ACM SIGKDD International Conference on Knowledge Discovery & Data Mining, Available Online at: https://arxiv.org/pdf/2102.04674.pdf, Feb. 9, 2021, 9 pages.

\* cited by examiner

IMAGE SEGMENTATION USING TEXT EMBEDDING

CROSS-REFERENCE TO RELATED APPLICATIONS

This application is a continuation of U.S. patent application Ser. No. 16/952,008, filed on Nov. 18, 2020, now allowed, the contents of all of which are incorporated herein by reference.

TECHNICAL FIELD

This disclosure relates generally to computer-implemented methods and systems for image processing. More specifically, but not by way of limitation, this disclosure involves generating object-segmented images using text embeddings of text queries.

BACKGROUND

Image segmentation is the process of identifying segments of an image. For example, image segmentation can include identifying specific objects within an image. For example, an image segmentation process involves using a machine-learning model to analyze an image depicting an animal and output an object class, such as "dog" or "cat."

Existing segmentation techniques are often limited in scope with respect to objects within an image that are available for segmentation. For instance, some approaches limit identification of objects within the image to a specific object class. These image segmentation techniques often rely on using a fixed set of annotated classes to predict a segmentation focus in an image. For instance, the fixed set of annotated classes can be limited to objects within particular classes, such as only predicting various types of food or various types of animals. Other approaches have used image saliency as a signal to extract a most important object within the image and refine the segmentation. For instance, an image saliency model generates an indication of a most important feature of the image, and the segmentation technique predicts a class of the most important feature.

The limitations in segmentation scope used by existing image segmentation techniques can decrease the quality of the image segmentation. For instance, limiting the segmentation scope could cause the segmentation technique to ignore certain details within the image or cause segmentation technique to segment the details into improper classes. Thus, these segmentation techniques result in misidentification of objects within images, failure to identify important objects in images, or both.

SUMMARY

Certain embodiments involve image segmentation operations. In one example, a non-transitory computer-readable medium includes program code that is stored thereon. The program code is executable by one or more processing devices for performing operations including generating, by a model that includes trainable components, a learned image representation of a target image. The operations further include generating, by a text embedding model, a text embedding of a text query, where the text embedding and the learned image representation of the target image are in a same embedding space. Additionally, the operations include generating a class activation map of the target image by, at least, convolving the learned image representation of the target image with the text embedding of the text query. Moreover, the operations include generating an object-segmented image using the class activation map of the target image.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
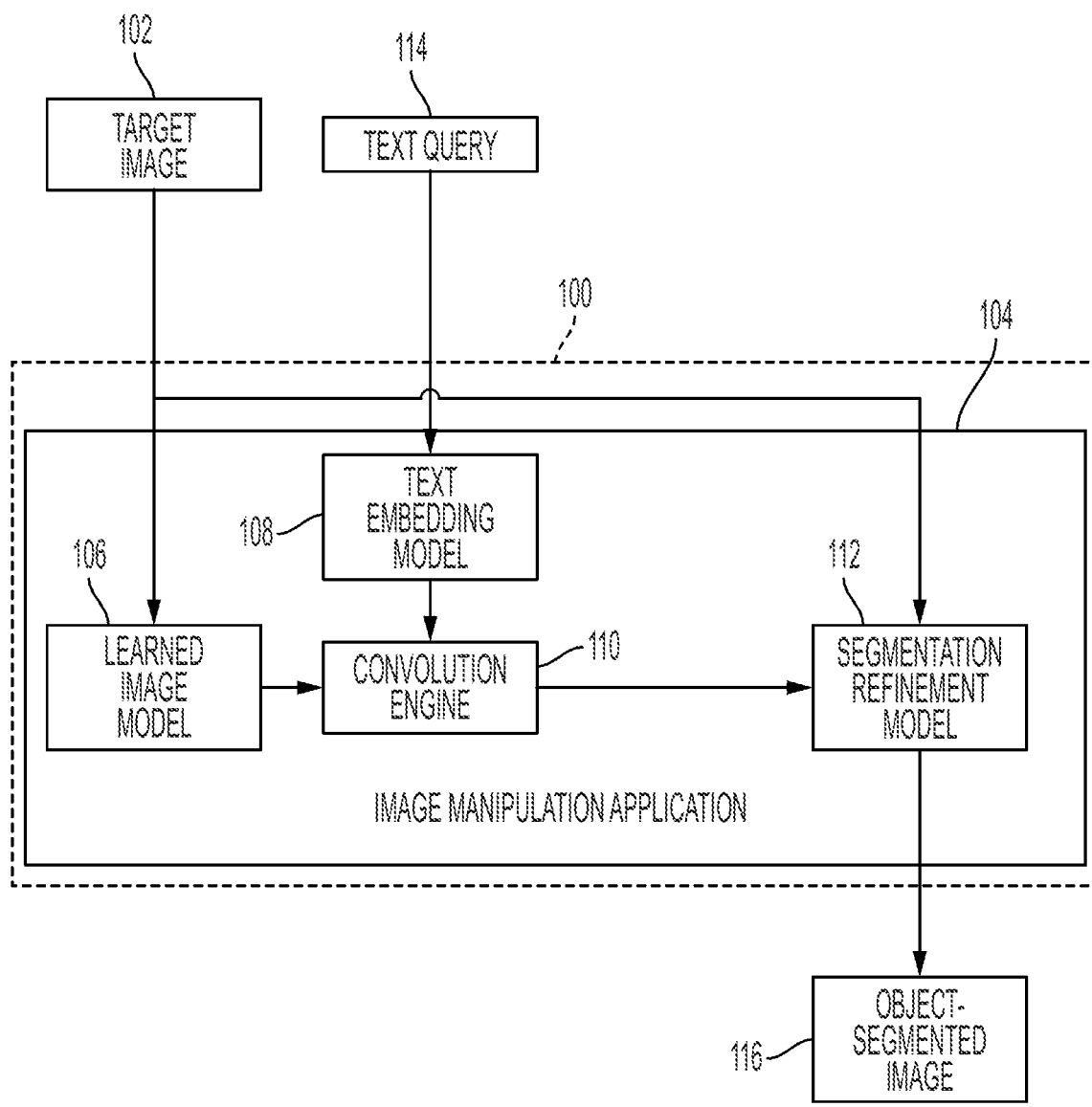
FIG. 1 depicts an example of a computing environment for performing an image-segmentation operation on a target image, according to certain embodiments of the present disclosure.

Certain embodiments involve image segmentation of a target image using a text query. As discussed above, existing image segmentation methods are prone to generating unsatisfactory results. This may hold especially true when objects within the target image fall outside of narrow ranges of classes available for the image segmentation methods. Certain embodiments described herein address these limitations by, for example, employing a learned image model and a text embedding model in a segmentation operation. The learned image model and the text embedding model generate representations of the target image and the text query in a common embedding space. A segmentation process uses the learned image representation and the text embedding in the common embedding space to generate an object-segmented image that is not constrained by the limited classes available in conventional segmentation techniques.

The following non-limiting example is provided to introduce certain embodiments. In this example, an image manipulation system having one or more processing devices executes image manipulation modules to capture information from target images received by the image manipulation system. For example, the image manipulation system receives a target image and a text query. The target image may be any image that includes one or more distinguishable objects. In an example, the text query is an indication of an object that a user would like segmented from the target image. The text query can be an individual word, such as "chair," or the text query can be a multi-word phrase, such as "dog in a chair."

Continuing with this example, a learned image model of the image manipulation system uses a trainable component, such as a convolutional neural network (CNN), to extract features from the target image. The learned image model generates, with the extracted features, a learned image representation of the target image in a feature embedding space for images. Similarly, a text embedding model of the image manipulation system extracts features from the text query to generate a text embedding of the text query that is also in the feature embedding space for images. In an example, the text embedding model is a language-neutral embedding model that embeds similar words or phrases near one another in embedding space even if the words or phrases are in different languages. For instance, the language-neutral embedding model receives text queries that include similar objects or phrases in different languages, and generates similar text embeddings in the common embedding space.

The text embedding and the learned image representation being in a common embedding space allows the image manipulation system to generate a class activation map by convolving the text embedding with the learned image representation. A segmentation refinement model of the image manipulation system performs a refinement operation on the class activation map to generate a higher resolution mask of an object associated with the text embedding in the target image. The higher resolution mask indicates that certain objects from the target image are not relevant to the text query, or otherwise highlights the objects of the target image that are relevant to the text query. The image manipulation system uses the higher resolution mask of the object to determine object classifications and, in some cases, locations of various objects in the target image, and thereby generate an object-segmented image of the target image and the text query.

As described herein, certain embodiments provide improvements in image processing by generating object-segmented images using deep learning techniques in a segmentation operation. For instance, the segmentation operation utilizes image features in a learned image representation of a target image and text embeddings of a text query to identify and isolate objects depicted in the target image that are associated with the text query. The text embeddings are language-neutral and represent text of the text query. Because the segmentation operation performs the segmentation based on a convolution of the learned image representation and the text embeddings, the segmentation operation avoids issues associated with a limited set of classes associated available for segmentation and performing an extra saliency step to identify an object for segmentation. For example, a convolution of the text embedding and a learned image representation results in a class activation map that highlights a user-specified class or object from the text query. A mask generated from the resulting class activation map masks portions of the target image not relevant to the text query. These deep learning techniques used in the segmentation operation increase segmentation scope and, thus, improve segmentation accuracy and availability to avoid or even eliminate some challenges associated with other segmentation techniques.

Example Operating Environment for Segmentation Operations Using Deep Learning Techniques Referring now to the drawings, FIG. 1 depicts an example of a computing environment 100 for performing segmentation operations with deep learning techniques to manipulate a target image 102. The computing environment 100 includes an image manipulation application 104. The image manipulation application 104 executes on one or more computing devices. In some examples, a computing network (e.g., a cloud computing network, software-as-a-service implementation) implements the image manipulation application 104. That is, the image manipulation application 104 may be hosted in the cloud or on a remote server and be accessible by other computing devices. The image manipulation application 104 includes a learned image model 106, a text embedding model 108, a convolution engine 110, and a segmentation refinement model 112.

In one example, the image manipulation application 104 receives the target image 102 from a user. In another example, the image manipulation application 104 selects the target image 102 from a bank of images stored in a memory associated with the computing environment 100. The image manipulation application 104 applies the learned image model 106, which is a content embedding CNN model such as a ResNet encoder, to the target image 102. Based on the content of the target image 102, the learned image model 106 generates a learned image representation of the target image 102. The learned image representation generated by the learned image model 106 is a multi-dimensional feature space representation of what is included in the image. For example, the feature space representation includes a number of components arranged in a three-dimensional shape, where every component is a representation of a feature at a specific location in the target image 102. In an example, a target image 102 including a dog may have a similar feature space representation at each component location in the multi-dimensional feature space that includes a dog.

The image manipulation application 104 applies the text embedding model 108 to a text query 114. The text query 114 can be a word or a phrase relating to the target image 102. For example, the text query 114 may be "dog" or "dog in a boat." In an example, the text embedding model 108 is a cross-lingual, multi-modal model. That is, the text embedding model 108 generates a text embedding representation of the text query 114 in a visual feature space. The visual feature space of the text embedding representation of the text query 114 is the same feature space as the feature space representation of the target image 102. For example, the text embedding representing the dog is similar to the feature space representations at each component location in the multi-dimensional feature space that includes a dog.

In an example, the text embedding model 108 is a cross-lingual, multi-modal model. That is, the image manipulation application 104 applies the text embedding model 108 to text queries 114 in multiple languages. Further, the text embedding representation generated by the text embedding model 102 is language neutral. In other words, a text query 114 of "perro," which is Spanish for "dog," will result in a similar text embedding representation as a text query 114 of "dog." In some examples, the image manipulation application 104 applies multi-lingual sentence encoders to the text queries 114 to generate an encoded representation of a sentence. The image manipulation application 104 uses the encoded representation of the sentence to generate the text embedding representation of the sentence in the visual feature space. The encoded representation generated by the multi-lingual sentence encoder is in an encoded representation space that is common for all languages supported by the multi-lingual sentence encoder.

The image manipulation application 104 applies the text embedding representation of the text query 114 and the learned image representation of the target image 102 to a convolution engine 110. The convolution engine 110 includes an additional convolution layer. For example, the convolution engine 110 performs a convolution on the multi-dimensional learned image representation of the target image 102 and the text embedding representation of the text query 114. A result of the convolution is a spatially aware attention to the object of the text query 114. For example, the convolution engine 110 generates a class activation map representation of the target image 102 that highlights a location of the object of the text query 114. The class activation map is a back-projection of what CNN, such as the learned image model 106, pays attention to when the CNN makes a prediction.

In an example where the class activation maps produce weak signals, such as when the learned image model 106 and the convolution engine 110 produce low resolution class activation maps, the image manipulation application 104 applies the segmentation refinement model 112 to the class activation maps. The segmentation refinement model 112 refines the class activation maps to a higher resolution mask, such as a fine-attention mask, to obtain finer segmentation details of the target image 102. In an example, the segmentation refinement model 112 may be a mask refinement network. In the example, the mask refinement network takes class activation maps at two different resolutions of the target image 102 (e.g., at one and two times the original size of the target image 102) along with the target image 102 as an input and outputs the fine-attention mask. The image manipulation application 104 applies the fine-attention mask to the target image 102 to generate an object-segmented image 116. In an example, the mask refinement network is trained to predict fine-attention masks for classes present in a training dataset, such as the classes of the COCO 80 dataset. Other datasets with additional classes can also be used to train the mask refinement network.

Examples of Computer-Implemented Operations for Segmentation Operations

Figure 2:
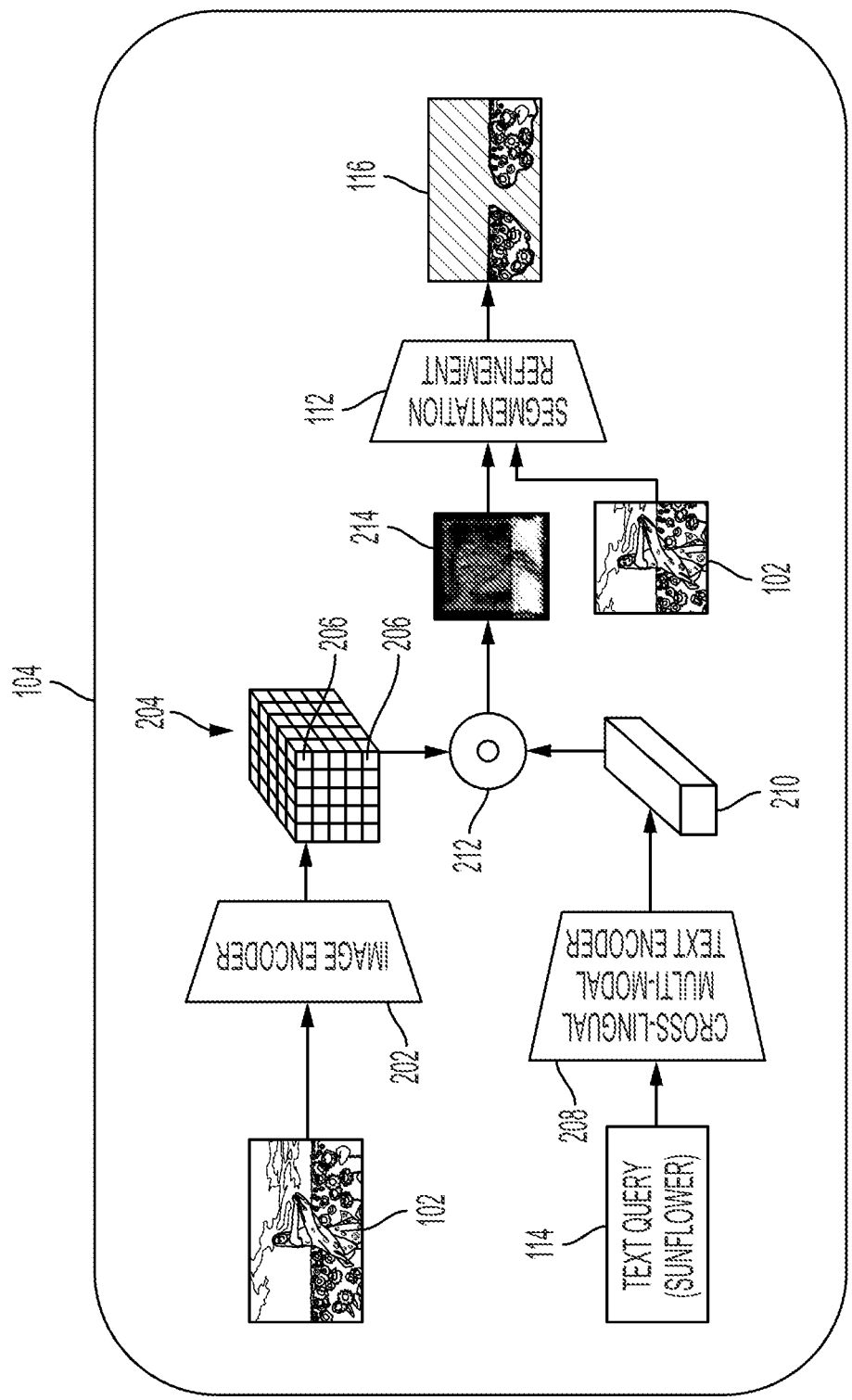
FIG. 2 depicts an example of the image-segmentation operation of FIG. 1, according to certain embodiments of the present disclosure.

FIG. 2 depicts an example of the image-segmentation operation of FIG. 1. The image manipulation application 104 receives the target image 102 and the text query 114 and generates the object-segmented image 116. As illustrated, the target image 102 in this example is an image of a woman in a field of sunflowers. Further, the text query 114 is the term "sunflower." Accordingly, the object-segmented image 116 generated by the image manipulation application 104 should segment or otherwise highlight the sunflowers from the target image 102 from other objects in the target image 102.

In an example, the image manipulation application 104 applies an image encoder 202, such as a ResNet encoder, to the target image 102. The image encoder 202 is a trainable CNN used to generate a learned image representation 204 of the target image 102. In an example, the image encoder 202 is an example of the learned image model 106 described above with respect to FIG. 1. Models other than the ResNet encoder may also be used as the image encoder 202 to generate the learned image representation 204 of the target image 102.

As illustrated, the learned image representation 204 is a three-dimensional feature space representation of the target image 102. The learned image representation 204 includes a number of components 206 arranged in a three-dimensional shape, where each component 206 is a representation of a feature of the target image 102 at a specific location within the target image 102. For example, some of the components 206 represent a location of the sunflowers within the target image 102, while other components 206 represent a location of the woman within the target image 102.

The text query 114 is a request for segmentation of the target image 102. As illustrated, the text query 114 requests segmentation of the term "sunflower." A cross-lingual, multi-modal text encoder 208 generates a text embedding 210 of the text query 114. The text embedding 210 is a representation of the text query 114 in the same visual feature space as the learned image representation 204 of the target image 102. For example, the text embedding 210 includes a format similar to the individual components 206 of the learned image representation 204.

The text encoder 208 is an example of the text embedding model 108 described above with respect to FIG. 1. In an example, the text encoder 208 is a simple, deep learning architecture that is trained on pairs of text and images. A dataset used for training the text encoder 208 can be an image and a corresponding caption of the image. During training, the deep learning architecture on the text side initially converts the text from the dataset into a cross-lingual embedding using a multi-lingual universal sentence encoder. After converting the text to the cross-lingual embedding, fully connected layers of the deep learning architecture use the cross-lingual embedding to generate a text embedding in an image space. In an example, the deep learning architecture applies a metric learning loss function (e.g., a triplet loss function, a linear loss function, a contrastive loss function, a lossless triplet loss function, and the like) to the resulting text embedding. The metric learning loss function optimizes the text embeddings to achieve a result that is similar to an embedding of the training image. For example, a larger loss magnitude of the text embedding indicates that the text embedding is not accurate, while a smaller loss magnitude of the text embedding indicates that the text embedding is more accurate. Further, the resulting trained deep learning architecture generates language-neutral text embeddings 210. For example, the term "girasol," which is sunflower in Spanish, generates the same or a similar text embedding 210 as the term "sunflower."

The image manipulation application 104 performs a convolution 212 on the learned image representation 204 and the text embedding 210 to generate a class activation map 214 of the target image 102. The convolution 212, such as the convolution engine 110 of FIG. 1, may be a 1×1 convolution. The class activation map 214 is a back-projection of what a CNN, such as the image encoder 202, pays attention to when the CNN makes a prediction. As illustrated, the class activation map 214 highlights locations in the target image 102 that the image encoder 202 pays attention to when the text query 114 is the term "sunflower."

The image manipulation application 104 applies the segmentation refinement model 112 to the class activation map 214 and the target image 102 to generate the object-segmented image 116. Because the class activation map 214 is typically low resolution, the segmentation refinement model 112 is able to refine the class activation map 214 to a higher resolution to obtain finer segmentation details of the target image 102. The image manipulation application 104 may use the higher resolution class activation map as a mask to generate the object-segmented image 116. As illustrated, the object-segmented image 116 displays the sunflowers from the target image 102.

Figure 3:
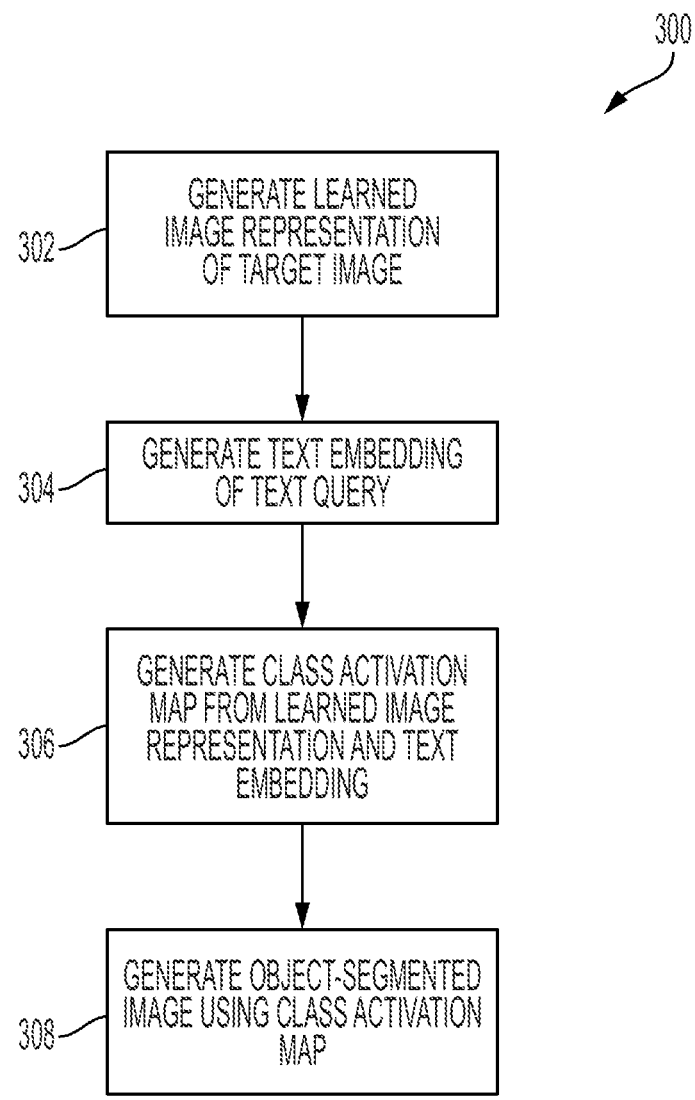
FIG. 3 depicts an example of a process for performing the image-segmentation operation on the target image of FIG. 1, according to certain embodiments of the present disclosure.

FIG. 3 depicts an example of a process 300 for generating the object-segmented image 116 from the target image 102 using the image-segmentation operation discussed above with respect to FIGS. 1 and 2. In some embodiments, one or more operations described herein with respect to blocks 302-308 are used to implement a step for a step for segmenting a target image 102 with a class activation map 214 generated from a text embedding 210 of a text query 114 and a learned image representation 204 of the target image 102. One or more computing devices in the computing environment 100 implement operations depicted in the process 300 by executing suitable program code (e.g., the image manipulation application 104). For illustrative purposes, the process 300 is described with reference to certain examples depicted in the figures. Other implementations, however, are possible.

At block 302, the process 300 involves generating the learned image representation 204 of the target image 102. For instance, the image manipulation application 104 can receive or otherwise access the target image 102, and the learned image model 106 can generate the feature space representation of the target image 102. In an example, the learned image model includes a CNN used to generate a feature vector that forms the learned image representation 204 of the target image 102. The feature vector include the components 206 of the learned image representation 204 that identify objects within the target image 102.

At block 304, the process 300 involves the text embedding 210 of the text query 114. For instance, the text embedding model 108, such as the text encoder 208, generates the text embedding 114 that represents the text query 114 in a same visual embedding space as the learned image representation 204. That is, the text embedding 210 is in a similar format as the components 206 of the learned image representation 204.

At block 306, the process 300 involves generating the class activation map 214 of the target image 102 from the learned image representation 204 and the text embedding 210. For instance, the convolution 212 of learned image representation 204 and the text embedding 210 generates the class activation map 214. The class activation map 214 represents focus areas of the target image 102 that are relevant to the text query 114. For example, the class activation map 214 may be a heat map indicating relevance of portions of the target image 102 to the text query 114.

At block 308, the process 300 involves generating the object-segmented image 116 using the class activation map 214. For instance, the class activation map 214 and the target image 102 are be applied to a segmentation refinement model 112 to generate a higher resolution version of the class activation map 214. The higher resolution version of the class activation map 214, such as a fine-attention mask, segments the portions of the target image 102 that are relevant to the text query 114 from the portions of the target image 102 that are not relevant to the text query 114. In an example, the resulting object-segmented image 116 masks the portions of the target image 102 that are not relevant to the text query 114.

In this manner, the process 300 is able to localize portions of the target image 102 that are related to the text query 114. In an additional example, the one or more computing devices may perform the process 300 in reverse. For example, a user identifies a component in the target image 102, such as the sunflowers, using a selection operation, such as a mouse click. The process 300 is then used in reverse to identify what object was selected in the target image 102. For example, the reverse operation outputs the term "sunflower" based on the user selection of sunflowers in the target image 102.

Figure 4:
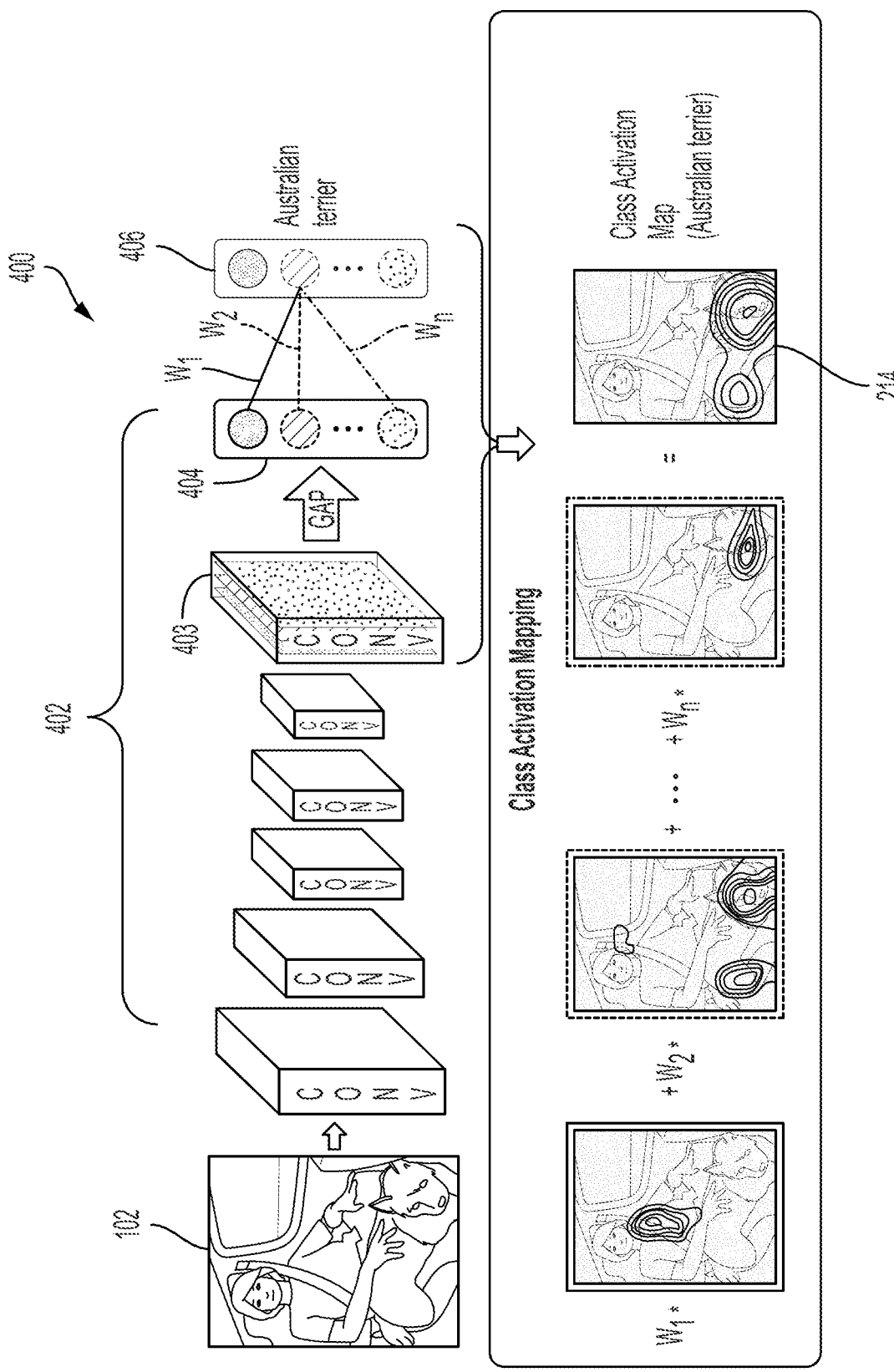
FIG. 4 depicts an example of a class activation mapping system of an image-segmentation operation, according to certain embodiments of the present disclosure.

FIG. 4 depicts an example of a class activation mapping system 400 of the image-segmentation operation described above with respect to FIGS. 1-3. The class activation map 214 highlights areas of the target image 102 that have contributed to a prediction of a CNN 402, such as the learned image model 106. In an example, the class activation maps 214 verify how well a neural network learns to understand classes in an intuitive way to humans.

The class activation mapping system 400 generates the class activation maps 214 as a function of a convolutional learning process. Shared filter banks 403 in final layers of a CNN 402 learn to activate on high level concepts on which the CNN 402 is trained. For example, an image classifier can be trained to activate on classes such as dog, cat, or bird or more fine-grained classes such as Australian terrier, Eiffel Tower, etc. Different filters in the filter banks 403 learn to activate on different high-level concepts that when combined generate a common representation that is unique to a particular class.

An average pooling process aggregates the activations of the filter banks 403 into an average pooled embedding 404, which is subsequently used for prediction of the object class to generate a prediction result 406. In this manner, an image with a dog, such as the target image 102 of FIG. 4, results in the filters with an enhanced response for dogs to activate in the region of the image that has a dog. Even in an example where portions of the target image 102 surrounding the dog include other features, the response to dog is strong enough to make an accurate classification. But the CNN 402 may struggle with multi-class images, such as those including a dog and a cat, due to the average pooling process. For example, the average pooling process results in dilution of both the dog and cat activations in the average pooled embedding 404, which limits the accuracy of the prediction result 406.

The class activation mapping system 400 calculates the class activation map 214 by convolving each location of a color by width by height tensor of the target image 102, such as the learned image representation 204, using the average pooled embedding 404. But the system 400 highlights individual objects or classes by obtaining the representation of the objects or classes generated by another image. This operation highlights the same objects or classes in the class activation map 214 and the other image. As discussed above, the text embedding model 108, such as the text encoder 208, generates the text embedding 210 of the text query 114 in the same feature space as the learned image representation 204. That is, the text embedding 210 of the text encoder 208 is in the same embedding space as the learned image representation 204 generated by the image encoder 202. The text embedding 210 of the text query 114 "dog" can be an embedding that is very close to a representation of "dog" generated in the learned image representation 204. Thus, convolving the text embedding 210 with the learned image representation 204 highlights all locations on in the learned image representation 204 that have a similar feature to the text embedding 210. In this manner, the class activation map 214 weakly localizes locations of the text query 114. Further refinement of the class activation map 214 using the segmentation refinement model 112 results in the object-segmented image 116.

Figure 5:
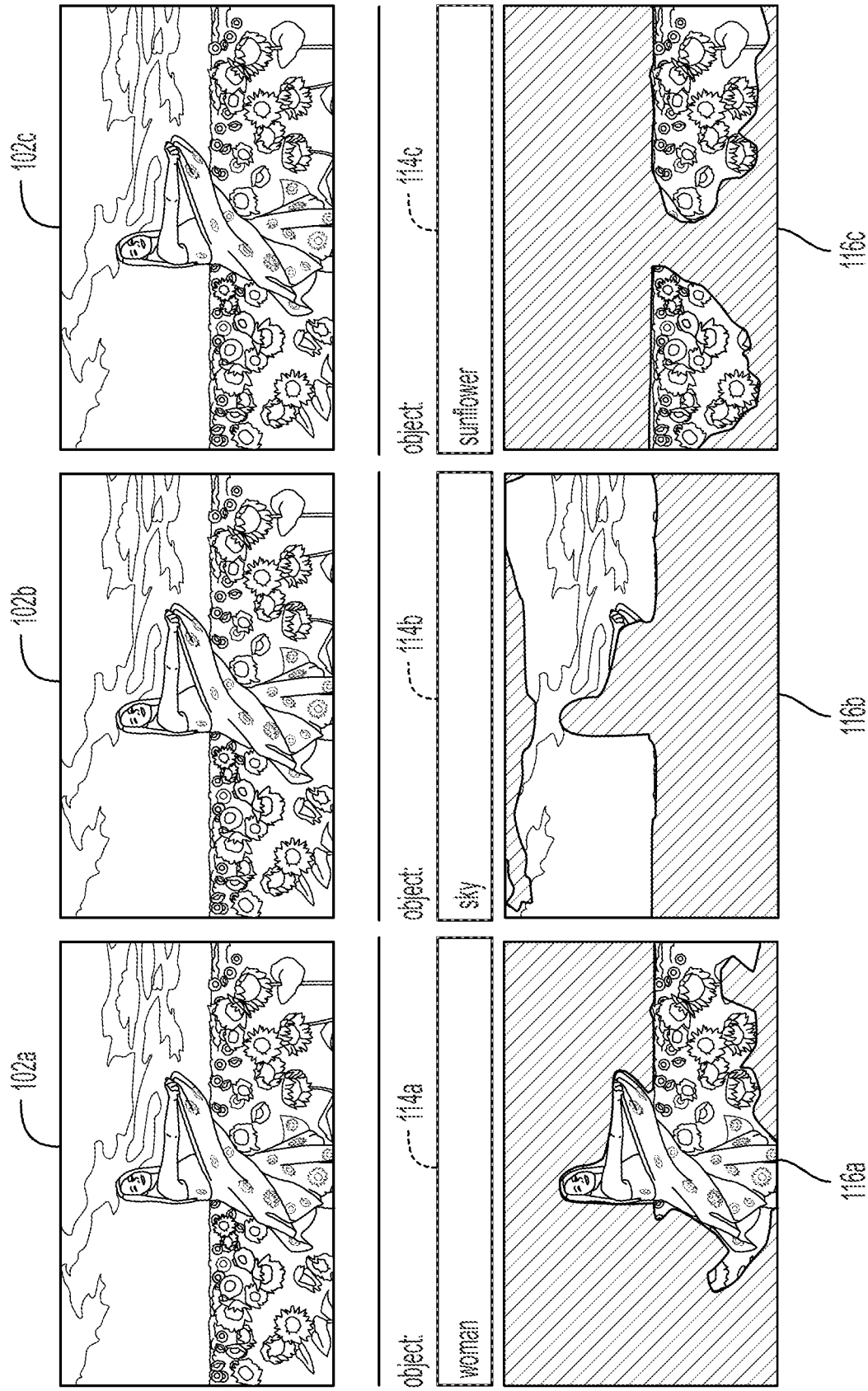
FIG. 5 depicts examples of a target image and resulting object-segmented images using the image-segmentation operation of FIG. 1, according to certain embodiments of the present disclosure.

To help illustrate the image-segmentation operation described above, FIG. 5 depicts examples of target images 102a, 102b, and 102c and resulting object-segmented images 116a, 116b, and 116c. The image manipulation application 104 generates the object-segmented image 116a upon receipt of the target image 102a and the text query 114a of "woman." The object-segmented image 116a displays the portions of the target image 102a identified by the image manipulation application 104 as being most closely associated with the term "woman." Similarly, the image manipulation application 104 generates the object-segmented image 116b upon receipt of the target image 102b and the text query 114b of "sky." The object-segmented image 116b displays the portions of the target image 102a identified by the image manipulation application 104 as being most closely associated with the term "sky." Further, the image manipulation application 104 generates the object-segmented image 116c upon receipt of the target image 102c and the text query 114c of "sunflower." The object-segmented image 116b displays the portions of the target image 102a identified by the image manipulation application 104 as being most closely associated with the term "sunflower."

In some examples, rather than masking out the portions of the target image 102 unrelated to the text query 114, the object-segmented image 116 highlights the regions of the target image 102 that are related to the text query 114. For example, the object-segmented images 116 leave the related portions in color while gray scaling the unrelated portions of the target image 102. Other techniques for highlighting the object-segmented images 116 may also be used.

Figure 6:
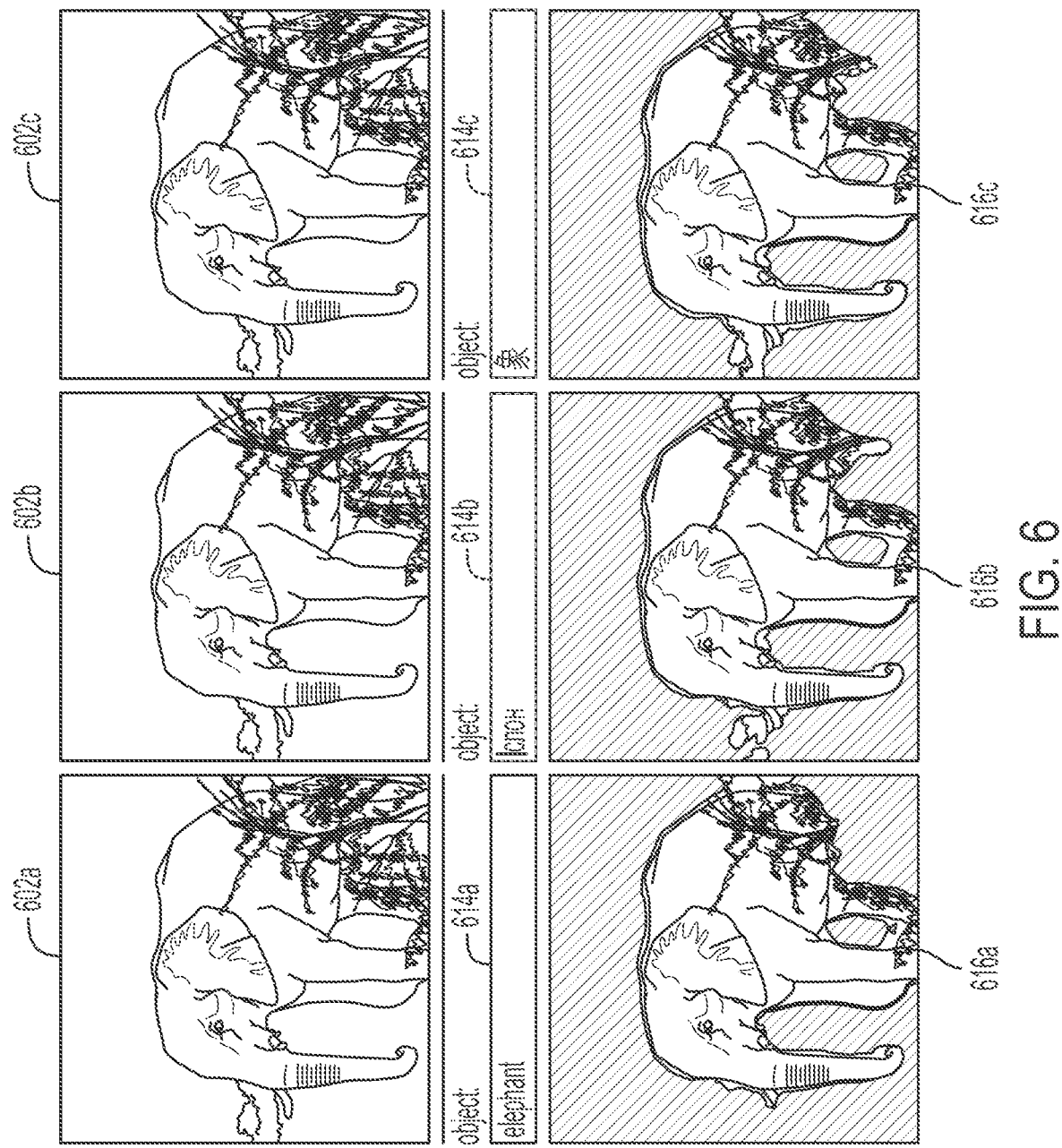
FIG. 6 depicts examples of a target image and resulting object-segmented images using a language-neutral image-segmentation operation, according to certain embodiments of the present disclosure.

FIG. 6 depicts examples of target images 602a, 602b, and 602c and resulting object-segmented images 616a, 616b, and 616c using a language-neutral image-segmentation operation. As discussed above, the text embedding model 108 is a multi-lingual embedding model. That is, the text embedding model 108 is able to generate the text embedding 210 for a text query 614 presented in a number of different languages. Further, the text embedding 210 represents the text query 614 in a language-neutral format. In other words, the text embedding 210 is the same or similar for text queries 614 of the same word or phrase provided in different languages.

The image manipulation application 104 generates the object-segmented image 616a upon receipt of the target image 602a and a text query 614a of "elephant" in English. The object-segmented image 616a displays the portions of the target image 602a identified by the image manipulation application 104 as being most closely associated with the English term "elephant." Similarly, the image manipulation application 104 generates the object-segmented image 616b upon receipt of the target image 602b and the text query 614b of "слон," which is elephant in Russian. The object-segmented image 616b displays the portions of the target image 602a identified by the image manipulation application 104 as being most closely associated with the term "слон." As shown, the object-segmented image 616b is very similar to the object-segmented image 616a. Further, the image manipulation application 104 generates the object-segmented image 616c upon receipt of the target image 602c and the text query 614c of "象," which is the Chinese character for elephant. The object-segmented image 616b displays the portions of the target image 602a identified by the image manipulation application 104 as being most closely associated with the symbol "象." As shown, the object-segmented image 616c is very similar to the object-segmented images 616a and 616b due to the language-neutral text embeddings 210 of the text queries 614a, 614b, and 614c.

Computing System Example for Generating an Object-Segmented Image

Figure 7:
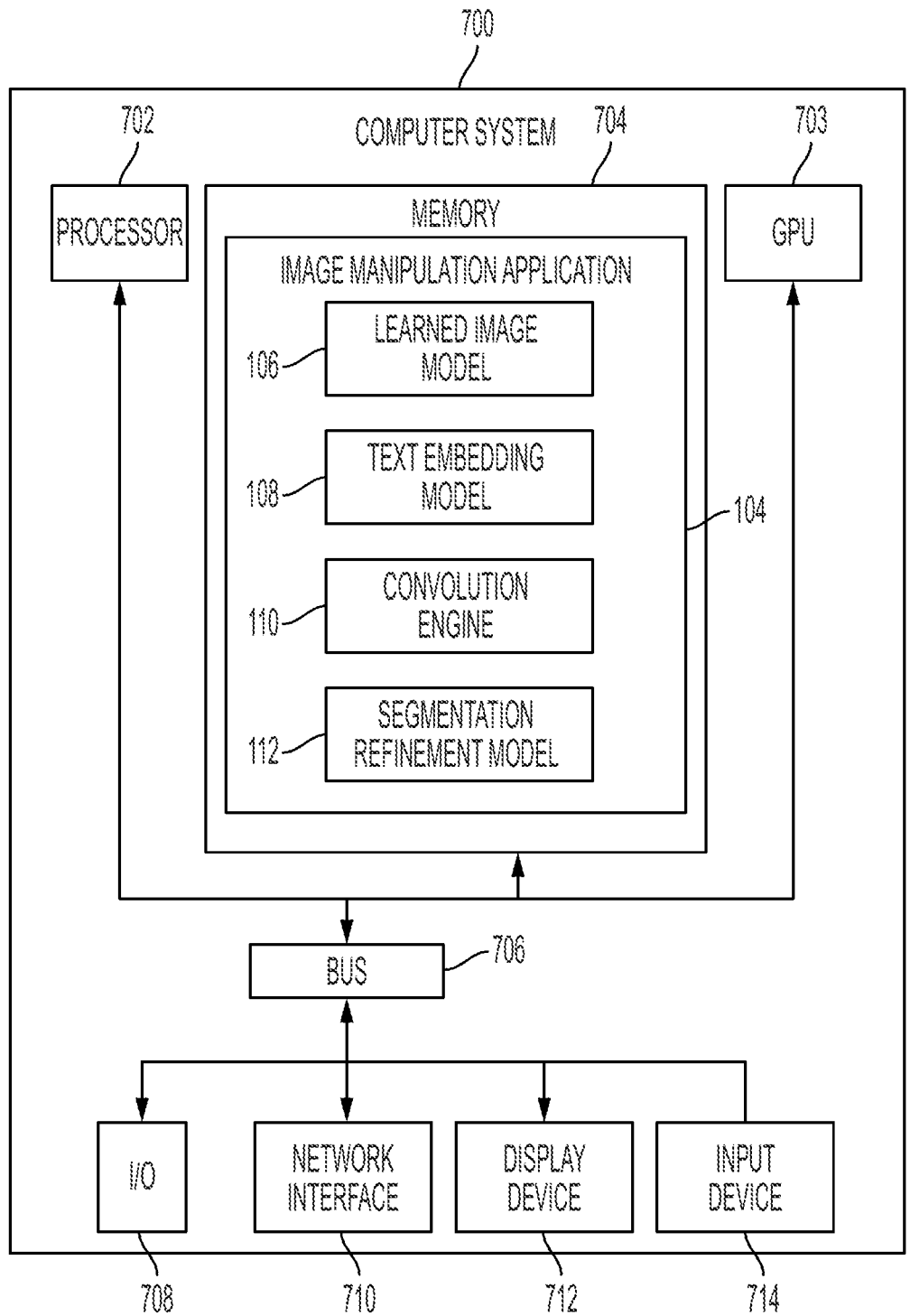
FIG. 7 depicts an example of a computing system that executes an image manipulation application for performing certain embodiments of the present disclosure.

Any suitable computing system or group of computing systems can be used for performing the operations described herein. For example, FIG. 7 depicts an example of a computing system 700 that can implement the computing environment of FIG. 1. In some embodiments, the computing system 700 includes a processor 702 that executes the image manipulation application 104, a memory 704 that stores various data computed or used by the image manipulation application 104, an input device 714 (e.g., a mouse, a stylus, a touchpad, a touchscreen, etc.), and a display device 712 that displays graphical content generated by the image manipulation application 104. For illustrative purposes, FIG. 7 depicts a single computing system that executes the image manipulation application 104 and includes the input device 714 and display device 712 are present. But these applications, datasets, and devices can be stored or included across different computing systems having devices similar to the devices depicted in FIG. 7.

The depicted example of a computing system 700 includes a processor 702 communicatively coupled to one or more memory devices 704. The processor 702 executes computer-executable program code stored in a memory device 704, accesses information stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices, including a single processing device. In an example, the computing system 700 includes a GPU 703. In another example, the processor 702 can be configured to perform the functions of the GPU 703 described herein (e.g., by causing the processor 702 to execute specialize graphics processing software).

The memory device 704 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 700 may also include a number of external or internal devices, such as an input device 714, a display device 712, or other input or output devices. For example, the computing system 700 is shown with one or more input/output ("I/O") interfaces 708. An I/O interface 708 can receive input from input devices or provide output-to-output devices. One or more buses 706 are also included in the computing system 700. The buses 706 communicatively couple one or more components of a respective one of the computing system 700.

The computing system 700 executes program code that configures the processor 702 to perform one or more of the operations described herein. The program code includes, for example, the image manipulation application 104 or other suitable applications that perform one or more operations described herein. The program code may be resident in the memory device 704 or any suitable computer-readable medium and may be executed by the processor 702 or any other suitable processor. In some embodiments, all modules in the image manipulation application 104 (e.g., the learned image model 106, the text embedding model 108, the convolution engine 110, the segmentation refinement model 112, etc.) are stored in the memory device 704, as depicted in FIG. 7. In additional or alternative embodiments, one or more of these modules from the image manipulation application 104 are stored in different memory devices of different computing systems.

In some embodiments, the computing system 700 also includes a network interface device 710. The network interface device 710 includes any device or group of devices suitable for establishing a wired or wireless data connection to one or more data networks. Non-limiting examples of the network interface device 710 include an Ethernet network adapter, a modem, and/or the like. The computing system 700 is able to communicate with one or more other computing devices (e.g., a computing device that receives inputs for image manipulation application 104 or displays outputs of the image manipulation application 104) via a data network using the network interface device 710.

An input device 714 can include any device or group of devices suitable for receiving visual, auditory, or other suitable input that controls or affects the operations of the processor 702. Non-limiting examples of the input device 714 include a touchscreen, stylus, a mouse, a keyboard, a microphone, a separate mobile computing device, etc. A display device 712 can include any device or group of devices suitable for providing visual, auditory, or other suitable sensory output. Non-limiting examples of the display device 712 include a touchscreen, a monitor, a separate mobile computing device, etc.

Although FIG. 7 depicts the input device 714 and the display device 712 as being local to the computing device that executes the image manipulation application 104, other implementations are possible. For instance, in some embodiments, one or more of the input device 714 and the display device 712 can include a remote client-computing device that communicates with the computing system 700 via the network interface device 710 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A non-transitory computer-readable medium having program code that is stored thereon, the program code executable by one or more processing devices for performing operations comprising:
   generating, using a model, a learned image representation of a target image;
   generating, using a text embedding model, a text embedding of a text query, wherein the text embedding and the learned image representation of the target image are in a same embedding space;
   convolving the learned image representation of the target image with the text embedding of the text query; and
   generating an object-segmented image based on the convolving of the learned image representation with the text embedding.

2. The non-transitory computer-readable medium of claim 1, wherein generating the object-segmented image comprises:
   generating a fine-attention mask by applying a mask refinement network to (i) a class activation map of the target image generated via the convolving of the learned image representation with the text embedding and (ii) the target image; and
   segmenting the target image into the object-segmented image by, at least, applying the fine-attention mask to the target image.

3. The non-transitory computer-readable medium of claim 1, wherein generating, by the model that includes trainable components, the learned image representation of the target image comprises applying a convolutional neural network to the target image to generate the learned image representation of the target image.

4. The non-transitory computer-readable medium of claim 1, wherein generating the learned image representation of the target image comprises generating the learned image representation of the target image in a three-dimensional feature space.

5. The non-transitory computer-readable medium of claim 1, wherein generating the text embedding of the text query comprises applying a cross-lingual, multi-modal model to the text query.

6. The non-transitory computer-readable medium of claim 1, wherein generating the text embedding of the text query comprises applying the text embedding model to a multi-word phrase to generate the text embedding of the multi-word phrase in the embedding space.

7. The non-transitory computer-readable medium of claim 1, wherein generating the text embedding of the text query comprises:
applying a universal sentence encoder to the text query to generate a cross-lingual representation of the text query; and
applying the text embedding model to the cross-lingual representation of the text query to generate the text embedding in the embedding space.

8. The non-transitory computer-readable medium of claim 1, wherein the object-segmented image is generated using a class activation map of the target image generated via the convolving of the learned image representation with the text embedding and wherein generating the object-segmented image further comprises highlighting at least one component of the target image that is relevant to the text query.

9. A method comprising:
receiving a target image and a text query;
a step for segmenting the target image based on convolving a learned image representation of the target image with a text embedding of the text query; and
outputting an object-segmented image generated by the step for segmenting the target image.

10. The method of claim 9, wherein the step for segmenting the target image comprises:
generating a fine-attention mask by applying a mask refinement network to (i) a class activation map of the target image determined via the convolving of the learned image representation of the target image with the text embedding of the text query, and to (ii) the target image; and
segmenting the target image into the object-segmented image by, at least, applying the fine-attention mask to the target image.

11. The method of claim 9, further comprising:
applying a convolutional neural network to the target image to generate the learned image representation of the target image.

12. The method of claim 11, wherein the learned image representation of the target image comprises a three-dimensional feature space.

13. The method of claim 9, further comprising:
applying a cross-lingual, multi-modal model to the text query to generate the text embedding.

14. The method of claim 9, further comprising:
applying a text embedding model to a multi-word phrase of the text query to generate the text embedding of the multi-word phrase, wherein the text embedding and the learned image representation of the target image are in a same embedding space.

15. The method of claim 9, further comprising:
applying a universal sentence encoder to the text query to generate a cross-lingual representation of the text query; and
applying a text embedding model to the cross-lingual representation of the text query to generate the text embedding.

16. A system comprising:
a processing device; and
a non-transitory computer-readable medium communicatively coupled to the processing device, wherein the processing device is configured to execute program code stored in the non-transitory computer-readable medium and thereby perform operations comprising:
accessing a learned image representation of a target image and a text embedding of a text query, wherein the text embedding and the learned image representation of the target image are in a same embedding space;
convolving the learned image representation of the target image with the text embedding of the text query; and
generating an object-segmented image based on the convolving.

17. The system of claim 16, wherein the operation of generating the object-segmented image further comprises:
generating a fine-attention mask by applying a mask refinement network to (i) a class activation map of the target image generated via the convolving and (ii) the target image; and
segmenting the target image into the object-segmented image by, at least, applying the fine-attention mask to the target image.

18. The system of claim 16, the operations further comprising:
generating, by a convolutional neural network, the learned image representation of the target image comprises.

19. The system of claim 16, the operations further comprising:
generating the learned image representation of the target image in a three-dimensional feature space.

20. The system of claim 16, wherein generating the object-segmented image based on the convolving further comprises highlighting at least one component of the target image that is relevant to the text query.

* * * * *